Nov. 20, 1928.  
L. N. DAVY  
1,692,293  
ZERO RESETTING DEVICE  
Filed June 1, 1925  
5 Sheets-Sheet 1
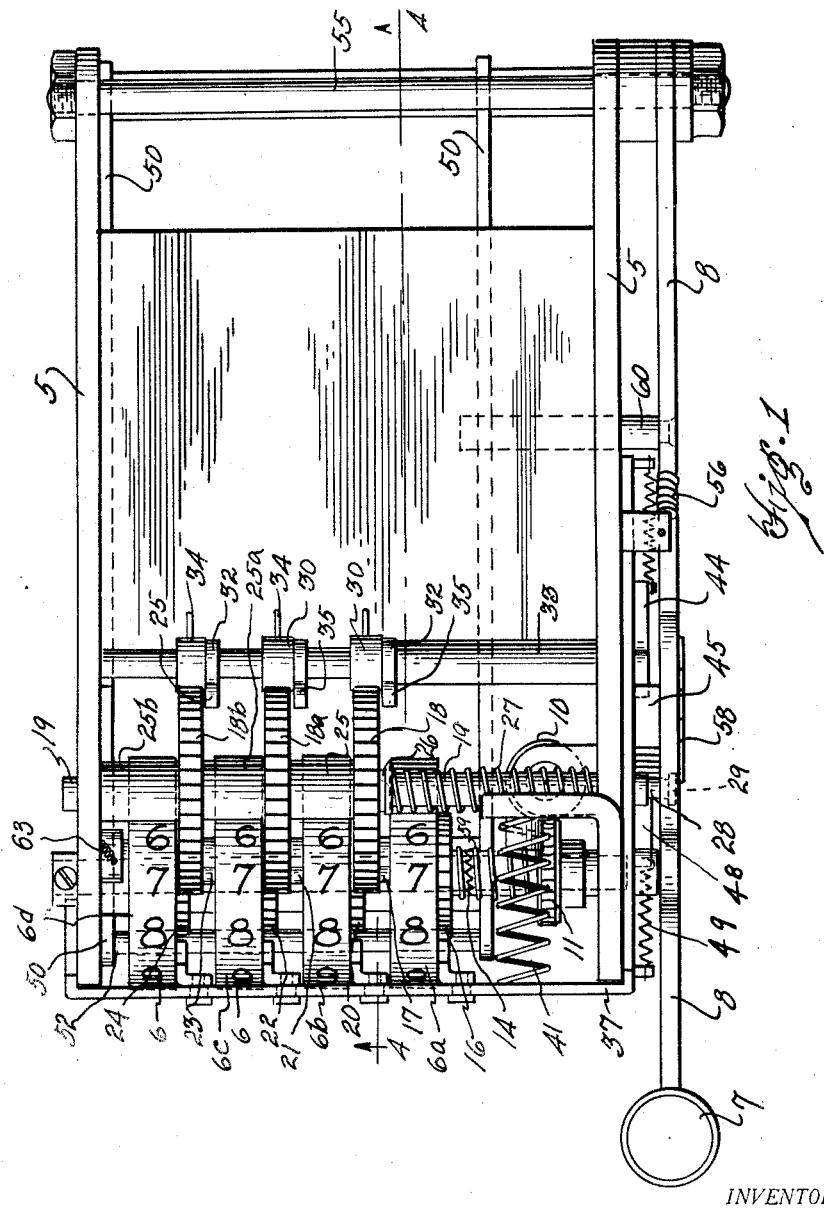
INVENTOR.  
LYNDEN N. DAVY  
BY  
Rex Frye.  
ATTORNEY.

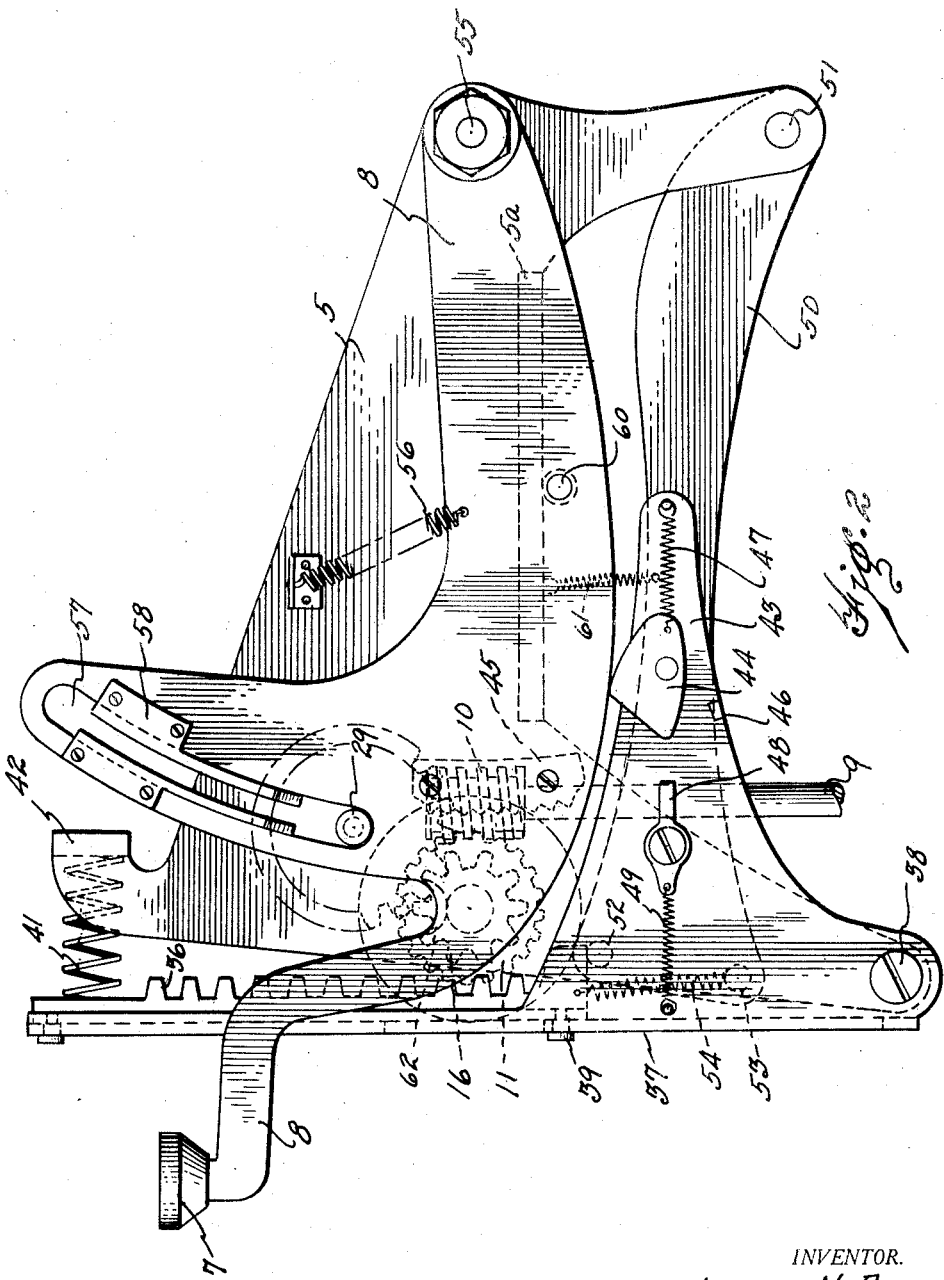

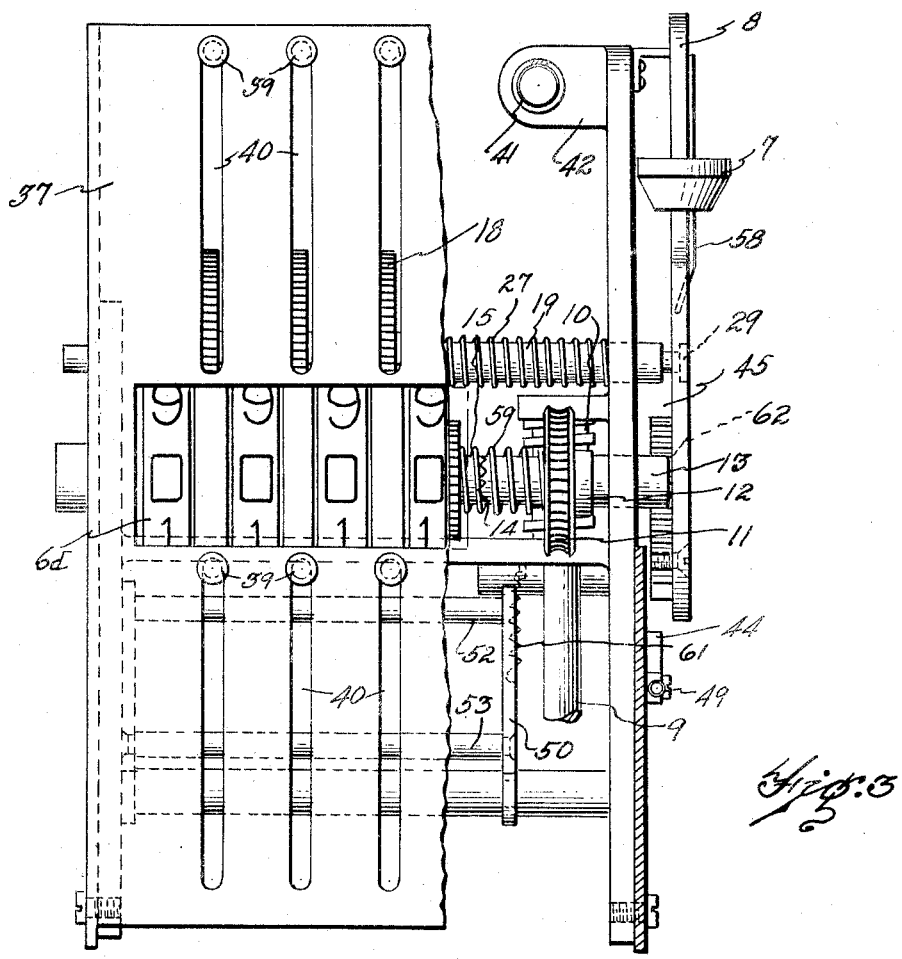

Nov. 20, 1928.
L. N. DAVY
1,692,293
ZERO RESETTING DEVICE
Filed June 1, 1925
5 Sheets-Sheet 4
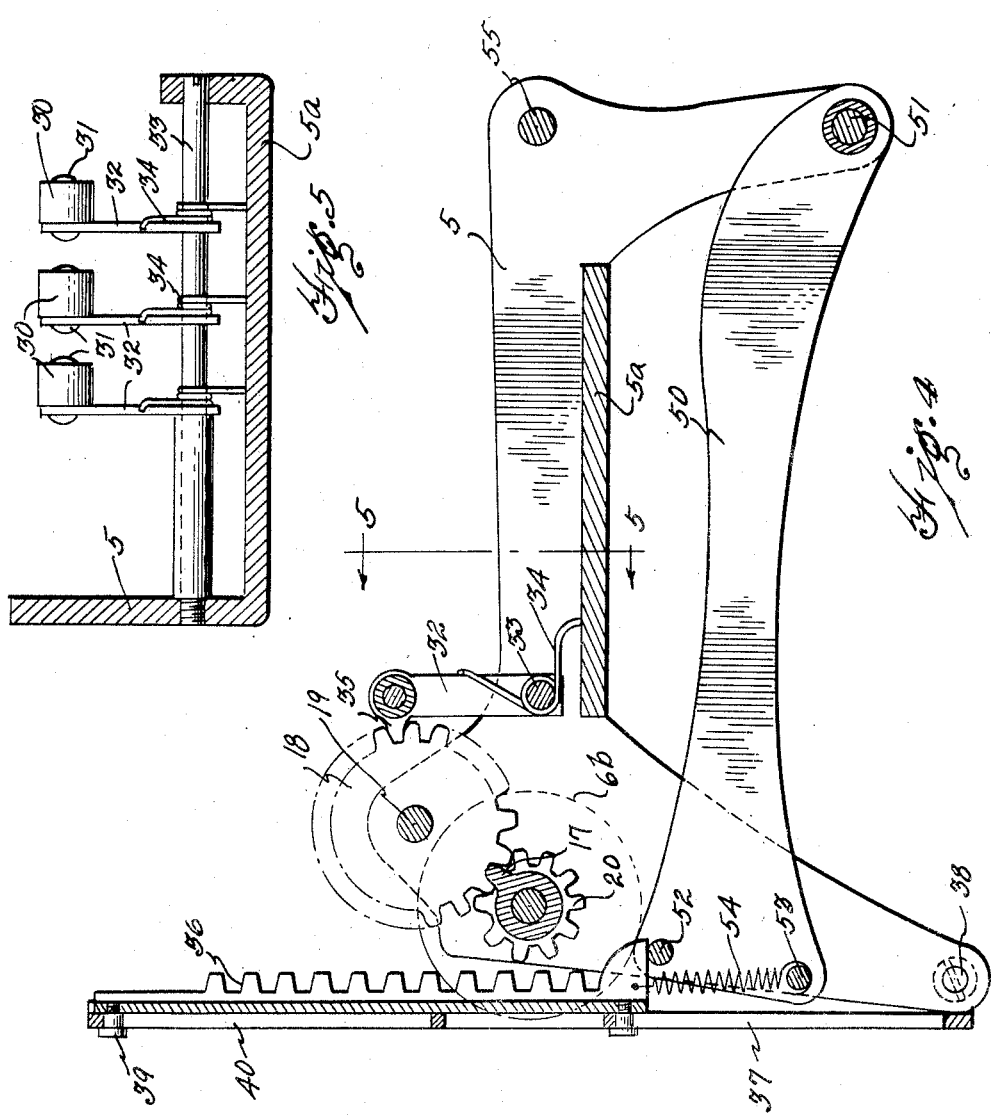
INVENTOR.
LYNDEN N. DAVY
BY
Rex Frye.
ATTORNEY.

Patented Nov. 20, 1928.

1,692,293

UNITED STATES PATENT OFFICE.

LYNDEN N. DAVY, OF CHEYENNE, WYOMING.

ZERO-RESETTING DEVICE.

Application filed June 1, 1925. Serial No. 33,946.

This invention relates to indicators of the mileage covered in one or a group of trips made in an automobile or other vehicle, and has for its principal object the provision of a trip indicator that can be readily restored to zero even when the vehicle is running.

Another object of this invention is the arrangement of a series of number wheels connected to accumulate the mileage covered by the vehicle with means for quickly freeing each of the number wheels and resetting them to zero whenever desired.

A further object of this invention is the mounting of a trip indicator on the dashboard of the vehicle or other convenient place with a resetting lever projecting through the dashboard into position to be readily grasped by the operator.

Other objects and advantages will be apparent from the following description, wherein reference is made to the accompanying drawings illustrating a preferred embodiment of my invention and wherein similar reference numerals designate similar parts throughout the several views.

In the drawings:

Fig. 1 is a plan view of my improved trip indicator.

Fig. 2 is a side elevation thereof, the parts being shown in their normal positions.

Fig. 3 is a front view thereof, with parts broken away.

Fig. 4 is a vertical section taken substantially on the line 4—4 of Fig. 1.

Fig. 5 is a detail cross section taken substantially on the line 5—5 of Fig. 4.

Figure 6:
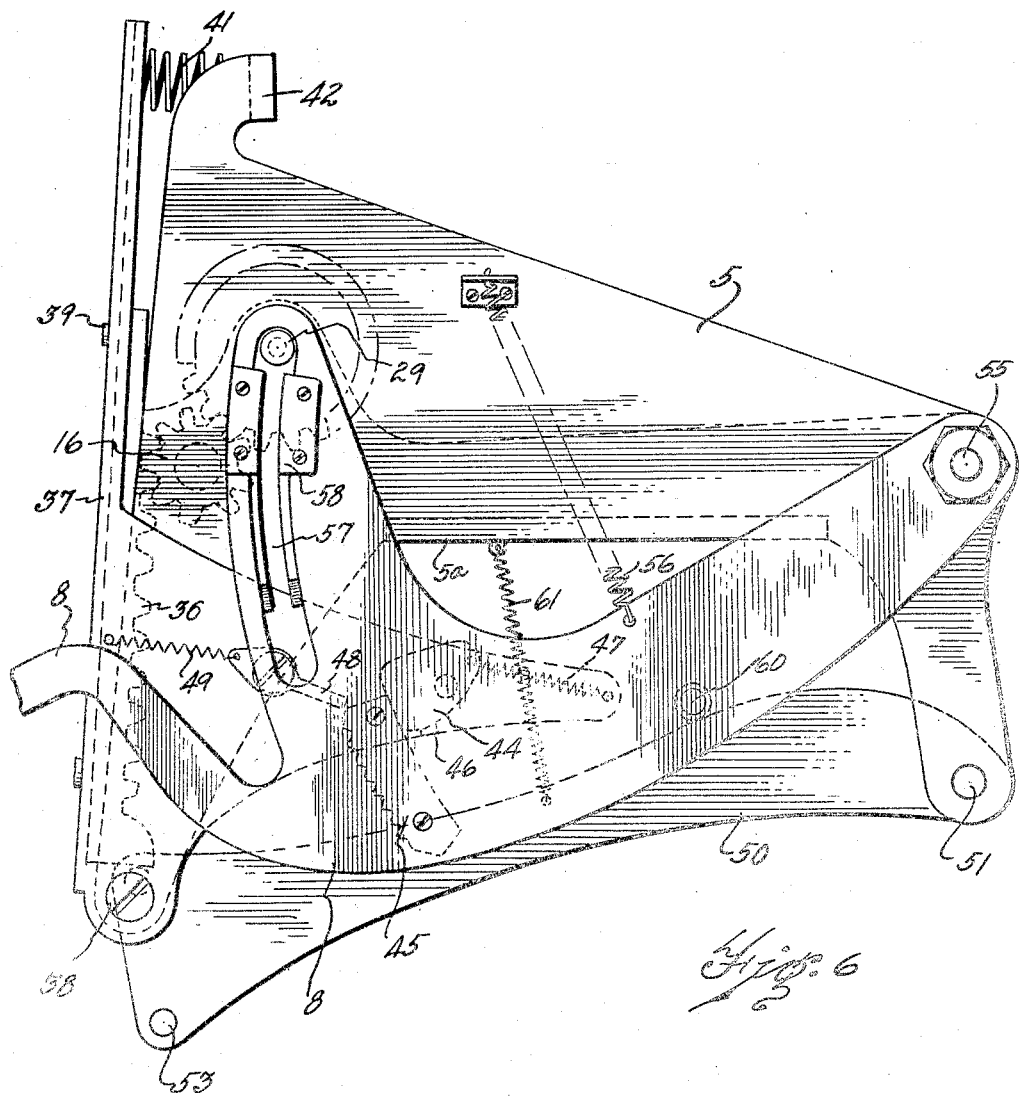
Fig. 6 is a view similar to Fig. 2 with the resetting mechanism in its lowermost position.

Referring now to the drawings, the numeral 5 designates the side frames of my improved trip indicator upon which the several parts thereof may be conveniently assembled and secured to the underside of the usual dashboard of an automobile or other vehicle, or in any other suitable location. Preferably my indicator is mounted so that one numeral on each of the numeral wheels 6 is visible through a horizontal slot in the dashboard, while the finger engaging contact 7 of the resetting lever 8 extends through a vertical slot in the dashboard so that the lever may be conveniently operated by the driver whenever desired. The numeral wheels 6 are connected so as to register the mileage covered by the vehicle. As herein shown a flexible shaft 9 extends upwardly from a suitable driving connection operated by one of the wheels of the vehicle and carries at its upper extremity a worm gear 10 arranged to mesh with the worm wheel 11 fixed upon a sleeve 12 fixed upon the shaft 13 arranged in horizontal alignment with the axes of the numeral wheels 6. At one extremity of the sleeve 12 is arranged one face of a crown clutch 14 adapted to co-act with a similar clutch face 15 extending laterally from the gear wheel 16 carried at one side of the first numeral wheel 6ª in the train of numeral wheels. It will be understood that any desired means may be employed between the wheels of the vehicle and the worm gear 10 to reduce the number of revolutions imparted to the worm gear so that the complete revolution of the worm wheel 11 and the first numeral wheel 6ª normally connected thereto will correctly register one mile. The periphery of the first numeral wheel 6ª is preferably marked to show tenths of a mile, and its gear 16 is preferably formed with ten teeth. Extending laterally from the side of the first numeral wheel 6ª opposite to that carrying the gear 16 is a stop pin 17 arranged to engage the teeth of the first carrying wheel 18 loosely mounted upon the shaft 19 extending between the side frames 5 and slidable in suitable apertures in the side frames, as hereinafter described. The carrying wheel 18 is normally in mesh with the gear 20 of the second numeral wheel 6ᵇ of the train of numeral wheels, and is much wider than the gear 20 so as to enable the stop pin 17 of the first numeral wheel 6ª to engage the carrying wheel without contacting the gear 20 of the second numeral wheel 6ᵇ. The second numeral wheel 6ᵇ also carries a stop pin 21 extending laterally into the path of movement of the second carrying wheel 18ª of the train of carrying wheels, which in turn normally meshes with the gear 22 of the numeral wheel 6ᶜ, and like the first mentioned carrying wheel is sufficiently wider than the gear 22 to enable the stop pin 21 to engage the teeth of the carrying wheel without contacting the gear 22. The third numeral wheel 6ᶜ is similarly constructed with a stop pin 23 extending laterally into the path of movement of the third carrying wheel 18ᵇ, which is normally in mesh with the gear 24 of the fourth numeral wheel 6ᵈ, and like the other carrying wheels of sufficient width to permit the engagement of the stop pin 23 with the teeth of the carrying wheel without contacting the gear 24. By virtue of this construction, the numeral wheels may be compactly arranged in alignment with each other so that the accumulation of mileage may be readily registered and the carrying wheels actuated so that they may, if desired, actuate a series of permanent registering mileage wheels (not shown).

In operation, the first numeral wheel 6ª is directly driven from the worm wheel 11 as long as the clutch faces 14 and 15 are in engagement. The revolution of the first numeral wheel will indicate one mile's travel of the vehicle, and the stop pin 17 will then engage the first carrying wheel 18 so as to advance it one notch, in the usual manner of accumulating indicator mechanism. The advance of the carrying wheel 18 will simultaneously advance the second numeral wheel 6ᵇ one notch, since the carrying wheel 18 and gear 20 of the second numeral wheel are normally in mesh. The gears 20, 22 and 24 preferably have ten teeth so that the advance of one tooth, as hereinbefore described, will rotate the numeral wheel through one-tenth of a revolution. The numerals on the periphery of the numeral wheels are also arranged so that their centers are separated by substantially thirty-six degrees, whereby the movement of the numeral wheel through one-tenth of a revolution will bring a new numeral into registry with the indicating slot in the dashboard. When the second numeral wheel 6ᵇ has made a complete revolution, its stop pin 21 engages the second carrying wheel 18ª so as to move it one notch, and so advances the third numeral wheel 6ᶜ through one-tenth of a revolution to change the indication in the slot in the dashboard. Inasmuch as the carrying wheels 18, 18ª and 18ᵇ are moved only when the stop pins of the adjacent numeral wheels contact therewith, it is immaterial how many teeth are formed upon the carrying wheels, and I preferably make them of sufficient diameter to permit their centers to be spaced a sufficient distance beyond the peripheries of the numeral wheels to permit the clearance of the supporting shaft 19 of the carrying wheels (note Fig. 4). The carrying wheel 18 is formed with a sleeve 25 adapted to contact the adjacent face of the second carrying wheel 18ª, which in turn carries a sleeve 25ª adapted to contact the adjacent face of the third carrying wheel 18ᵇ, which in turn carries a sleeve 25ᵇ adapted to engage a pin projecting from the shaft 19 so that the movement of the shaft 19 to the right will slide all of the carrying wheels. The first carrying wheel 18 is also formed with a collar 26 adapted to engage one extremity of a coil spring 27 surrounding the shaft 19 between the first carrying wheel and the right hand side frame 5 (note Fig. 1). The right extremity of the shaft 19 extends beyond the side frame 5 into position to be engaged by the resetting lever 8, a circular groove 28 being formed between a head 29 and the remainder of the shaft 19. When the resetting lever 8 is depressed, as hereinafter described, the shaft 19 is slid to the right a sufficient distance to demesh all of the carrying wheels from adjacent gears of the numeral wheels, but not sufficient to remove the carrying gears from the paths of movement of the adjacent stop pins of the numeral wheels. The sliding movement to the right is against the tension of the coil spring 27, and as soon as the pressure of the resetting lever is removed from the shaft 19, the spring 27 slides the shaft 19 to the left and returns all the carrying wheels into mesh with the respective gears of the adjacent numeral wheels. While the numeral wheels and carrying gears are demeshed the numeral wheels may be readily returned to zero position, as hereinafter described.

A series of rollers 30 are arranged to yieldingly press against the carrying wheels to provide a friction drag that will prevent any carrying wheel from moving more than one notch when struck by the stop pin of its adjacent numeral wheel. The rollers 30 normally seat between adjacent teeth on the carrying wheel, and when the stop pin engages the carrying wheel to advance it one of the teeth then in contact with the roller will force it rearwardly sufficiently to permit it riding over the edge of the tooth and then falling into the next space between teeth. As herein illustrated, each roller is pivoted upon a stub shaft 31 secured in the upper extremity of an upright arm 32, which is pivoted adjacent its lower extremity on the shaft 33 secured between the side frames 5. A light spring 34 is arranged to press the arm 32 and its attached roller into engagement with the carrying wheel, the spring being herein shown as coiled around the shaft 33 and having one extremity pressing against the arm 32 while its other extremity abuts against the upper face of the shelf 5ª extending between the side frames 5 (note Figs. 4 and 5). Adjacent the upper extremity of each arm 32 is formed a forwardly projecting ear 35 shaped and positioned so that it will fit between adjacent teeth on a carrying wheel whenever the carrying wheels are slid to the right to demesh them from their numeral wheel gears. This interlocking of the ear 35 with the carrying wheel holds the carrying wheel against rotation when it is contacted by the stop pin of its adjacent numeral wheel during the resetting of the numeral wheels, and so forms a fixed abutment for the stop pin by means of which the numeral wheel is stopped at its zero position.

A series of racks 36 are arranged for vertical movement on the plate 37 pivotally mounted at its lower extremity upon the shaft 38 extending between the side frames 5, the racks preferably being provided with headed pins 39 extending through vertically arranged slots 40 in the guide plate. Each rack 36 is positioned in alignment with one of the gears of the numeral wheels, but are normally spaced therefrom, as by the spring 41 arranged between the upper extremity of the guide plate 37 and a bracket 42 on one of the side frames 5. This spring presses the upper extremity of the guide plate 37 outwardly and so swings the racks 36 secured upon the guide plate forwardly of the gears of the numeral wheels. Means are provided for tilting the guide plate 37 against the tension of the spring 41 whenever it is desired to reset the numeral wheels to their zero positions, this tilting movement serving to bring the racks 36 into mesh with the gears in the numeral wheels. As herein shown, a tilting lever 43 is secured upon the lower portion of the guide plate 37 and extends rearwardly therefrom into juxtaposition to the resetting lever 8. An actuating cam 44 is pivotally mounted upon the side of the tilting lever 43 adjacent the path of travel of the resetting lever 8, and is adapted to be engaged by the notched plate 45 secured upon the inner side of the resetting lever (note Fig. 2). When first contacted by the notched plate 45 the cam 44 is rocked on its pivot until its lower edge abuts against the lug 46 extending laterally from the lower extremity of the tilting lever, and further movement of the notched plate 45 will then swing the tilting lever 43 so as to rock the guide plate 37 on its shaft 38 to bring the racks 36 into mesh with the gears of the numeral wheels. A light spring 47 is arranged to normally hold the cam 44 away from the lug 46. A locking pawl 48 is pivoted upon the tilting lever 43 forwardly of the cam 44 so as to engage in the notches in the notched plate 45 and prevent the returning of the resetting lever 8 unless the resetting lever has been moved to its lowermost position. The pawl 48 rides over the notches in the notched plate 45 as long as the resetting lever is moved downwardly, and the plate 45 is so positioned that when the resetting lever has reached its lowermost position the pawl 48 is above the upper extremity of the plate 45. Then during the return movement of the resetting lever the pawl 48 will move idly over the notches in the notched plate 45. A light spring 49 is arranged to normally hold the pawl 48 in substantially the position shown in Fig. 2. During the upward movement of the resetting lever 8 the cam 44 is swung upwardly out of engagement with the lug 46 by the notched plate 45, and so presents no obstacle to the return movement of the resetting lever. When the swinging movement of the tilting lever 43 has swung the racks 36 into mesh with the gears of the numeral wheels, the racks are moved downwardly to rotate the numeral wheels back to their zero positions. This is accomplished by means of the lowering lever 50, best shown in Figs. 4 and 6. This lever comprises a pair of spaced members pivoted adjacent their rear extremities on the shaft 51 extending between the side frames 5 below the shaft on which the resetting lever 8 is pivoted, and connected adjacent their forward extremities by a pair of cross bars 52 and 53 respectively. A series of coil springs 54 are arranged between the foot of each rack 36 and the lower cross bar 53 of the lowering lever, whereby a pulling action on each rack is secured as long as the rack is free to move downwardly, which is until the numeral wheel with which the rack is then in mesh has returned to its zero position, and then, after the stop pin of the numeral wheel engages the locked carrying wheel to prevent further rotation of the numeral wheel, the rack is held against downward movement but its attached spring 54 may extend to permit further swinging movement of the lowering lever 50. It will, accordingly, be seen that it is immaterial whether a numeral wheel has to be returned through a substantially complete revolution or only a small part thereof to reach its zero position. The throw of the lowering lever 50 is sufficient to move each rack 36 downwardly for a sufficient distance to rotate its numeral wheel through a complete revolution, and if the stop pin of any numeral wheel engages the locked carrying wheel before the full movement of the rack has been secured, the rack is immediately stopped while the lowering lever continues to swing. Since there is no carrying wheel in the path of travel of the stop pin of the last numeral wheel 6$^d$, I provide a spring-pressed ratchet 63 on the side frame 5 so arranged as to permit the stop pin of this numeral wheel to ride by it when the wheel is rotated in one direction but preventing further rotation of the wheel in the reverse direction after the stop pin engages the ratchet.

The resetting lever 8 is pivoted adjacent its rear extremity on the shaft 55 extending between the side frames 5, and is arranged to swing vertically adjacent the right extremity of the indicating mechanism against the tension of the coil spring 56 (note Fig. 2). The upper portion of the resetting lever 8 is formed with a curved slot 57 adapted to receive the headed right extremity of the shaft 19 on which the carrying wheels are journaled. Preferably a pair of resilient plates 58 are secured at each side of the slot 57, substantially as shown in Fig. 2, and are inclined at their lower extremities to provide a wedge adapted to cause the sliding movement of the shaft 19 to the right when-over the resetting lever is depressed. It will be noted that the inclined lower portions of the plates 58 are normally spaced a distance from the headed end 29 of the shaft 19 so as to permit a predetermined extent of movement of the resetting lever before the inclined portions engage the shaft 19. Similarly the upper extremities of the plates 58 are spaced from the upper extremity of the slot 57 so as to permit the headed end of the shaft 19 to pass beyond the plates 58 when the resetting lever is adjacent its lowermost position. The resetting lever 8 is also utilized to hold in mesh the faces 14 and 15 of the crown clutch between the worm wheel 11 and the first numeral wheel against the tension of the coil spring 59 arranged between the worm wheel 11 and the first numeral wheel so as to normally press the worm wheel and its attached clutch face toward the right. The movement of the worm wheel 11 and its clutch face is stopped by the abutting of the extremity of the shaft carrying the worm wheel against the inner face of the resetting lever 8 whenever the resetting lever is in its normal position (note Figs. 1 and 2). The resetting lever is cut away, however, so that a relatively small downward movement of the resetting lever will move it out of engagement with the right extremity of the shaft carrying the worm wheel 11, and, accordingly, permit the spring 59 to throw the worm wheel 11 and its clutch face out of its engagement with the companion clutch member to disconnect the numeral wheels from the driving mechanism actuated by the vehicle. It will, accordingly, be seen that when the resetting lever 8 is depressed to return the several numeral wheels to their zero positions several things are successively accomplished. First, the resetting lever is moved away from engagement with the shaft carrying the worm wheel 11 to permit the unclutching of the connection between the vehicle and numeral wheels; second, the inclined portions of the plates 58 slide the shaft 19 and the carrying wheels journaled thereon to the right to demesh the carrying wheels from the several gears on the numeral wheels and lock the several carrying wheels against rotation by bringing them into engagement with the several ears 35 on the arms 32; third, the notched plate 45 is moved into engagement with the actuating cam 44 to tilt the lever 43 so as to bring the racks 36 into mesh with the several gears of the numeral wheels—which are now free to rotate, and fourth, a cross bar 60 carried by the resetting lever is brought into engagement with the rack lowering lever 50 to swing this lever and the several racks downwardly to rotate the numeral wheels to their zero positions. As hereinbefore explained each numeral wheel rotates until its stop pin engages the adjacent carrying wheel, which is now locked against rotation and serves as an abutment to prevent further rotation of the numeral wheels. Further movement of the lowering lever 50 is permitted by the stretching of the springs 54 between the lowering lever and the racks 36. When the resetting lever has reached its lowermost position the headed end of the shaft 19 rides over the upper extremity of the plates 58, and the coil spring 27 slides the shaft 19 and the carrying wheels back to their normal positions in mesh with the gears of the numeral wheels. The resetting lever can now be released, and its spring 56 returns it to its normal position. During the upward movement of the resetting lever the tilting lever 43 is freed so as to permit the coil spring 41 to swing the guide plate 37 and racks 36 out of mesh with the gears of the numeral wheels; and the cross bar 60 relieves the pressure on the lowering lever 50 so as to permit the coil spring 61 arranged between the lowering lever and the shelf 5ª of the frame-work to lift the lowering lever to its normal position. The upper cross bar 52 on the lever 50 is arranged to engage the feet of the racks 36 and force them upwardly to their normal positions during the return movement of the lever 50. As the resetting lever approaches its uppermost position it contacts the right extremity of the shaft carrying the worm wheel 11 and forces this shaft to the left so as to again bring the clutch faces 14 and 15 into mesh. To assist in this sliding movement an inclined portion 62 (note Fig. 3), is provided on the resetting lever. The apparatus is now in position to register the mileage of the vehicle.

From the above it will be seen that all that is necessary for the driver to do to reset my indicating apparatus is to press the lever 8 downwardly to its full extent, and it is immaterial whether or not this is done while the vehicle is in motion for the first result of the downward movement of the resetting lever 8 is the freeing of the mechanism driven by the vehicle from the numeral wheels. Then the carrying wheels are demeshed from the numeral wheels and locked against rotation, the racks are swung into engagement with the gears of the numeral wheels, and the racks then moved downwardly to simultaneously return each numeral wheel to its zero position, which is controlled by the contact of the stop pin on the numeral wheel with the locked carrying wheel. When the resetting lever has reached its lowermost position, the driver removes his hand and the indicating mechanism is automatically returned to operative position with all the numeral wheels indicating zero. Should it happen that the driver does not press the resetting lever completely downward, the pawl 48 will engage in one of the notches of the plate 45 and hold the resetting lever against return movement, rendering the device inoperative for registering purposes, and immediately calling attention to the fact that something further must be done.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:

1. In trip indicators for vehicles having a plurality of numeral wheels arranged to be turned from a moving part of the vehicle, and means for resetting all the numeral wheels to zero position including means for detaching the numeral wheels from the moving part of the vehicle, means including normally disengaged racks for simultaneously rotating the numeral wheels in the reverse direction, and means for successively stopping the numeral wheels when they have reached zero position.

2. In trip indicators for vehicles having a plurality of numeral wheels arranged to be turned from a moving part of the vehicle, and means for resetting all the numeral wheels to zero position including means for detaching the numeral wheels from the moving part of the vehicle, means including normally disengaged racks for simultaneously rotating the numeral wheels in the reverse direction, means for stopping the numeral wheels when they have reached zero position, and a resetting lever controlling the actuation of all of said means.

3. In trip indicators for vehicles having a plurality of numeral wheels arranged to be turned from a moving part of the vehicle, means for resetting all the numeral wheels to zero position including a gear secured on each numeral wheel, and means for detaching the numeral wheels from the moving part of the vehicle, a plurality of racks normally disengaged from said gears and arranged to be moved into engagement with said gears, means for moving the racks into engagement with said gears and then to rotate the gears to return the wheels to zero positions, and means for stopping the wheels at their zero positions.

4. In trip indicators for vehicles having a plurality of numeral wheels arranged to be turned from a moving part of the vehicle, means for resetting all the numeral wheels to zero position including a gear secured on each numeral wheel, and means for detaching the numeral wheels from the moving part of the vehicle, a plurality of racks normally disengaged from said gears and arranged to be moved into engagement with said gears, a rack lowering lever, resilient connections between each rack and said lever, means for lowering the lever to simultaneously rotate each numeral wheel to zero position, and means for successively stopping the numeral wheels at their zero positions.

5. In trip indicators for vehicles having a plurality of numeral wheels arranged to be turned from a moving part of the vehicle, means for resetting all the numeral wheels to zero position including a gear secured to each numeral wheel, a stop pin also secured to each numeral wheel, and means for detaching the numeral wheels from the moving part of the vehicle, means including normally disengaged racks adapted to be moved into engagement with the gears after said detaching means have operated to return the wheels toward their zero positions, means for engaging said stop pins when the wheels have reached their zero positions, and a resetting lever controlling the actuation of all of said means.

6. In trip indicators for vehicles having a series of numeral wheels each carrying a gear and a stop pin, means for detachably connecting the first numeral wheel of the series with a moving part of the vehicle, carrying wheels arranged between adjacent numeral wheels in position to normally mesh with the gear of one numeral wheel and be engaged by the stop pin of the preceding numeral wheel of the series, and means for sliding the carrying wheels out of mesh with their respective gears, stops arranged beside the carrying wheels to lock the carrying wheels when so slid out of mesh with their respective gears, means for detaching the first numeral wheel of the series from the moving part of the vehicle, and means for rotating the numeral wheels to zero positions when the carrying wheels are demeshed therefrom.

7. In trip indicators for vehicles having a series of numeral wheels each carrying a gear and a stop pin, means for detachably connecting the first numeral wheel of the series with a moving part of the vehicle, carrying wheels arranged between adjacent numeral wheels in position to normally mesh with the gear of one numeral wheel and be engaged by the stop pin of the preceding numeral wheel of the series, and means for sliding the carrying wheels out of mesh with their respective gears, stops arranged beside the carrying wheels to lock the carrying wheels when so slid out of mesh with their respective gears, means for detaching the first numeral wheel of the series from the moving part of the vehicle, and means including normally disengaged racks for simultaneously rotating the numeral wheels to zero positions when the carrying wheels are demeshed therefrom.

8. In trip indicators for vehicles having a series of numeral wheels each carrying a gear and a stop pin, means for detachably connecting the first numeral wheel of the series with a moving part of the vehicle, carrying wheels arranged between adjacent numeral wheels in position to normally mesh with the gear of one numeral wheel and be engaged by the stop pin of the preceding numeral wheel of the series, and means for sliding the carrying wheels out of mesh with their respective gears, stops arranged beside the carrying wheels to lock the carrying wheels when so slid out of mesh with their respective gears, means for detaching the first numeral wheel of the series from the moving part of the vehicle, and means for reversely rotating the numeral wheels until their stop pins engage the locked carrying wheels.

9. In trip indicators for vehicles having a series of numeral wheels each carrying a gear and a stop pin, means for detachably connecting the first numeral wheel of the series with a moving part of the vehicle, carrying wheels arranged between adjacent numeral wheels in position to normally mesh with the gear of one numeral wheel and be engaged by the stop pin of the preceding numeral wheel of the series, and means for sliding the carrying wheels out of mesh with their respective gears, stops arranged beside the carrying wheels to lock the carrying wheels when so slid out of mesh with their respective gears, means for detaching the first numeral wheel of the series from the moving part of the vehicle, a series of racks arranged to be moved into engagement with said gears after the carrying wheels are demeshed therefrom, and means for moving said racks to reversely rotate said numeral wheels until their stop pins engage the locked carrying wheels.

10. In trip indicators for vehicles having a series of numeral wheels each carrying a gear and a stop pin, means for detachably connecting the first numeral wheel of the series with a moving part of the vehicle, carrying wheels arranged between adjacent numeral wheels in position to normally mesh with the gear of one numeral wheel and be engaged by the stop pin of the preceding numeral wheel of the series, a resetting lever arranged to control the position of the connecting means between the moving part of the vehicle and the first numeral wheel, and means actuated from the resetting lever for demeshing the carrying wheels from their respective gears of the numeral wheels, means including normally disengaged racks for returning the numeral wheels to zero while the carrying wheels are demeshed therefrom.

11. In trip indicators for vehicles having a series of numeral wheels each carrying a gear and a stop pin, means for detachably connecting the first numeral wheel of the series with a moving part of the vehicle, carrying wheels arranged between adjacent numeral wheels in position to normally mesh with the gear of one numeral wheel and be engaged by the stop pin of the preceding numeral wheel of the series, a resetting lever arranged to control the position of the connecting means between the moving part of the vehicle and the first numeral wheel, and means actuated from the resetting lever for demeshing the carrying wheels from their respective gears of the numeral wheels, means under the control of the resetting lever for returning the numeral wheels to zero while the carrying wheels are demeshed therefrom, including normally disengaged racks movable into engagement with the gears of the numeral wheels.

12. In trip indicators for vehicles having a series of numeral wheels each carrying a gear and a stop pin, means for detachably connecting the first numeral wheel of the series with a moving part of the vehicle, and carrying wheels arranged between adjacent numeral wheels in position to normally mesh with the gear of one numeral wheel and be engaged by the stop pin of the preceding numeral wheel of the series, a plurality of racks arranged in alignment with the gears of the numeral wheels but normally disengaged therefrom, means under the control of a resetting lever for moving said racks into engagement with the gears of the numeral wheels, and means for moving said racks to return the numeral wheels to zero positions.

13. In trip indicators for vehicles having a series of numeral wheels each carrying a gear and a stop pin, means for detachably connecting the first numeral wheel of the series with a moving part of the vehicle, and carrying wheels arranged between adjacent numeral wheels in position to normally mesh with the gear of one numeral wheel and be engaged by the stop pin of the preceding numeral wheel of the series, a plurality of racks arranged in alignment with the gears of the numeral wheels but normally disengaged therefrom, means under the control of a resetting lever for moving said racks into engagement with the gears of the numeral wheels, and means under the control of the resetting lever for lowering said racks while in engagement with their respective gears to return the numeral wheels to their zero positions.

14. In zero setting mechanism, the combination of a plurality of numeral wheels each carrying a gear and a stop pin, carrying wheels adapted to be locked in the path of movement of said stop pins, and means for reversely rotating the numeral wheels until their stop pins engage the locked carrying wheels.

15. In zero setting mechanism, the combination of a plurality of numeral wheels each carrying a gear and a stop pin, carrying wheels adapted to be locked in the path of movement of said stop pins, a plurality of racks arranged to be moved into engagement with said gears, and means for moving the racks to reversely rotate the numeral wheels until their stop pins engage the locked carrying wheels.

16. In zero setting mechanism, the combination of a plurality of numeral wheels each carrying a gear and a stop pin, carrying wheels adapted to be locked in the path of movement of said stop pins, a plurality of racks arranged to be moved into engagement with said gears, a rack lowering lever, resilient connections between said lever and each rack, and means for lowering the lever to reversely rotate the numeral wheels until their stop pins engage the locked carrying wheels.

17. In zero setting mechanism, the combination of a plurality of numeral wheels each carrying a gear and a stop pin, carrying wheels adapted to be locked in the path of movement of said stop pins, a resetting lever, and means actuated from said resetting lever for reversely rotating the numeral wheels until their stop pins engage the locked carrying wheels.

In witness whereof I hereunto set my hand.

LYNDEN N. DAVY.